United States Patent [19]
Porter et al.

[11] Patent Number: 6,067,805
[45] Date of Patent: May 30, 2000

[54] ADAPTIVE PRETRIP SELECTION

[75] Inventors: Kevin J. Porter, Syracuse; Thomas J. Dobmeier, Baldwinsville, both of N.Y.

[73] Assignee: Carrier Corporation, Farmington, Conn.

[21] Appl. No.: 09/234,032

[22] Filed: Jan. 19, 1999

[51] Int. Cl.⁷ .................................................. F25B 49/00
[52] U.S. Cl. .............................. 62/125; 62/127; 62/129; 62/228.3
[58] Field of Search .......................... 62/125, 126, 127, 62/129, 130, 228.3

[56] References Cited

U.S. PATENT DOCUMENTS

| | | |
|---|---|---|
| 5,140,825 | 8/1992 | Hanson et al. . |
| 5,140,826 | 8/1992 | Hanson et al. ............................. 62/115 |
| 5,172,561 | 12/1992 | Hanson et al. . |
| 5,424,720 | 6/1995 | Kirkpatrick ............................. 340/585 |
| 5,438,841 | 8/1995 | Cahill-O'Brien et al. .................. 62/78 |
| 5,647,222 | 7/1997 | Sarakinis .................................. 62/129 |
| 5,977,647 | 11/1999 | Lenz et al. ............................. 290/40 C |

*Primary Examiner*—Henry Bennett
*Assistant Examiner*—Marc Norman
*Attorney, Agent, or Firm*—Wall Marjama Bilinski & Burr

[57] ABSTRACT

A refrigeration system for cooling or heating an area includes a condenser for removing heat from the system to an external environment, an evaporator for receiving heat from the area to be cooled or delivering heat to the area to be heated, and a compressor for raising the pressure and the temperature of a refrigerant. Prior to placing the system in a cooling or heating/defrost mode, it is desirable to run a pretrip routine to determine the operational condition of the refrigeration system. In the present invention, a pretrip device determines a refrigeration system parameter, and from this parameter selects one of at least two possible pretrip routine variations. Finally, the pretrip device executes the selected pretrip routine in order to determine the operational condition of a refrigeration system.

36 Claims, 4 Drawing Sheets

ADAPTIVE PRETRIP SELECTION

FIELD OF THE INVENTION

This invention relates to the field of refrigeration systems for heating or cooling a controlled environment, and in particular to a testing routine for a refrigeration system, and more particularly to a device or method for selecting a particular pretrip testing routine variation based on a system parameter.

BACKGROUND OF THE INVENTION

Refrigeration systems are used in many applications for heating and cooling a controlled environment, including a cargo box on a transport truck, train, ship or plane. The refrigeration system has many components including a condenser, an evaporator, and a compressor. Before transporting the cargo, it is desirable to determine whether the refrigeration system is in an operational condition.

There have been some attempts to use a pretrip device to determine the operational condition of the refrigeration system prior to transportation. One such device to Hanson et al., U.S. Pat. No. 5,172,561, includes a pretrip device which determines the operational condition of the refrigeration system as a function of temperature change. However, this pretrip device always runs the same pretrip routine independent of whether environmental conditions call for the refrigeration system to operate in a heating mode or a cooling mode. As a result, the refrigeration system is not properly adjusted prior to beginning the operational testing of the refrigeration system, which results in false alarms and various other faulty results.

When an alarm is signaled, the refrigeration system must be taken out of service and be inspected for problems, which takes time and costs money. When the alarm is false, it takes longer to service because there are no identifiable problems.

SUMMARY OF THE INVENTION

Therefore, it is an object of the present invention to overcome the limitations of the prior art.

It is a further object of the present invention to provide a pretrip device operating a pretrip routine for determining the operational condition of a refrigeration system.

It is another object of the present invention to provide a pretrip device operating a pretrip routine for selecting one of at least two possible pretrip variations.

It is yet a further object of the present invention to provide a pretrip device operating a pretrip routine that will select one of at least two possible pretrip variations based on a measured refrigeration system parameter.

It is another object of the present invention to provide a pretrip device operating a pretrip routine to determine the operational condition of a compressor prior to placing the compressor in an on-line state.

It is still another object of the present invention to provide a pretrip device operating a pretrip routine to determine the operational condition of a discharge check valve of a refrigeration system prior to placing the refrigeration system in an on-line state.

Still another object of the present invention is to provide a pretrip device operating a pretrip routine to determine the operational condition of a refrigeration system valve prior to placing the refrigeration system in an on-line state.

It is yet another object of the present invention to provide a pretrip device operating a pretrip routine to signal an alarm when a component of the refrigeration system is in a non-operational condition.

It is still another object of the present invention to provide a pretrip device operating a pretrip routine that results in a minimal number of false alarms.

These and other objects are provided for by a pretrip testing device for testing the operation of a refrigeration system having a compressor, said device comprising:

determination means for determining a refrigeration system parameter, wherein said system parameter is an indication of an operational characteristic of said refrigeration system;

selection means for selecting one of at least two possible pretrip routine variations based on said system parameter; and execution means for executing said selected pretrip routine variation in order to test the operation of said refrigeration system in accordance with a protocol that depends on said system parameter.

Further objects, features and advantages of the present invention will become apparent when reading the Detailed Description of the Invention in conjunction with the drawings.

DETAILED DESCRIPTION OF THE INVENTION

Figure 1:
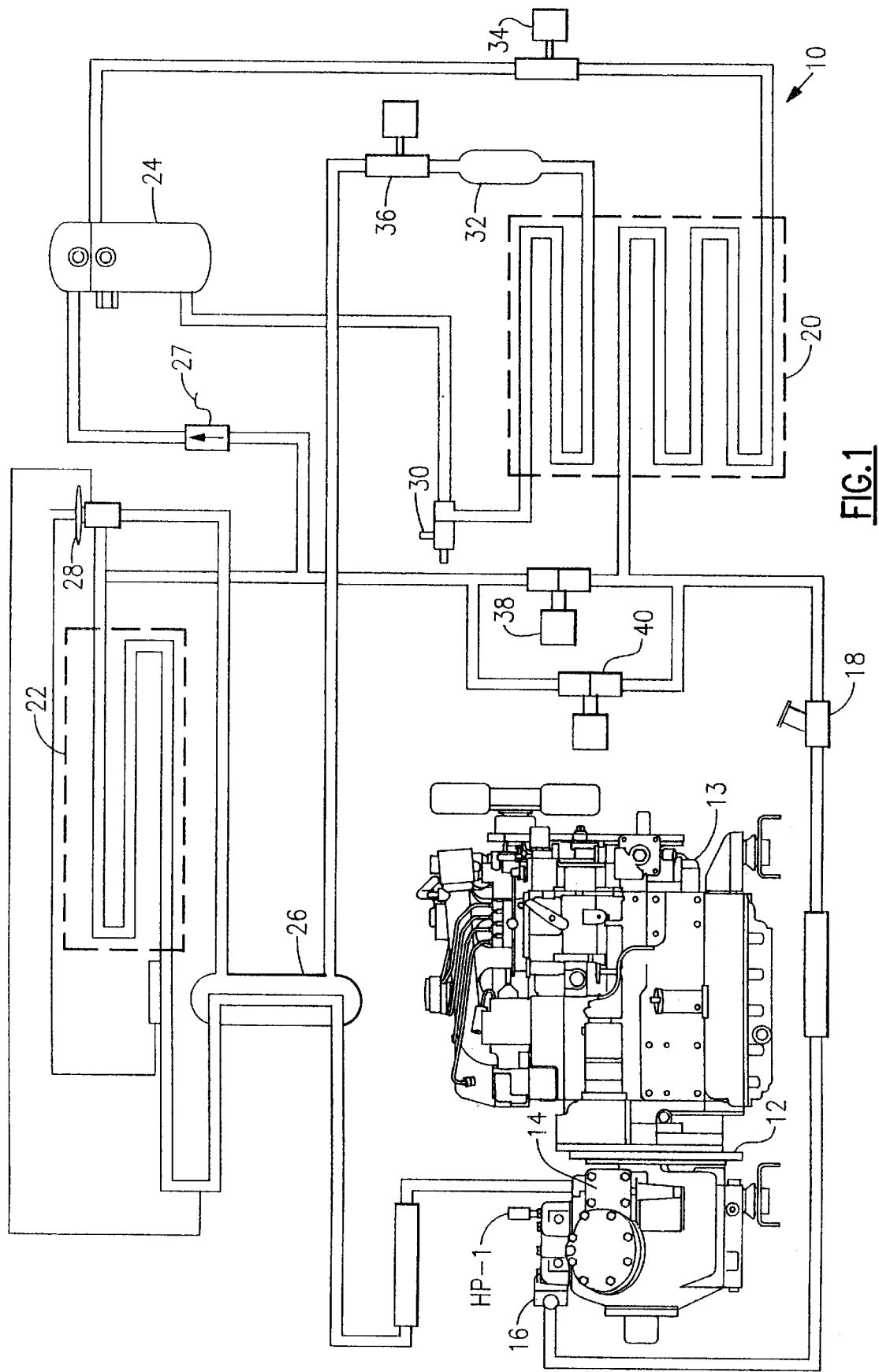
FIG. 1, is a schematic diagram of a refrigeration system.

One particular example of a refrigeration system in which the present invention may be employed is shown in FIG. 1. Refrigeration system 10 includes a compressor 12 driven by an engine 13, a suction service valve 14, a discharge service valve 16, a discharge check valve 18, an air cooled condenser 20 which includes a subcooler portion, an evaporator 22, a receiver 24, a heat exchanger 26, a bypass check valve 27, an expansion valve 28, a manual receiver shutoff valve 30, a filter drier 32, a plurality of valves 34, 36, 38, 40 (typically provided by solenoid valves), a front and rear unloader (not shown), a speed control solenoid 45 (FIG. 2), and an evaporator fan clutch (not shown). Compressor 12 includes a discharge or "high" side 15 and a suction, or "low" side 17. By convention, components of system 10 located toward high side 15 including discharge check valve 18 and condenser 20 are termed "high side" system components whereas system components located toward low side 15 including evaporator 22 and expansion valve 28 are termed "low side" system components. Furthermore, the region of system 10 between discharge side 15 and condenser 20 is conveniently referred to as the "high side" or "high pressure side" of system 10, while the region of system between condenser 20 and suction side 17 is conveniently referred to as the "low side" or "low pressure side" of system 10. Because valves 34–40 all operate to control the flow of refrigerant between high and low side system components, they are sometimes referred to herein as high to low side valves. The refrigeration system 10 operates in various modes, including a cooling mode and a heating/ defrost mode. In the cooling mode, the refrigeration system 10 removes heat from a work space. In the heating mode, the refrigeration system 10 adds heat to the work space. In the defrosting mode, the refrigeration system adds energy to the evaporator, where the evaporator fan clutch is off, thus defrosting the evaporator.

Preliminarily, note that any known refrigerant may be used in the system, and that all references made to gas or liquid herein are actually referring to the state of the refrigerant at different places during operation. Generally, the purpose of the refrigerant is to pick up heat by evaporating at low pressure and temperature, and to give up heat by condensing at high temperature and pressure. For instance, by manipulating the pressure of the refrigerant to appropriate levels, the same refrigerant can evaporate at 40 degrees F. and condense at 120 degrees F. By evaporating at a low temperature, heat will flow from the work space into the refrigerant within the direct expansion evaporator 22. Conversely, the refrigerant rejects heat when it condenses from a gas into a liquid. This process is explained in greater detail below.

Operation of the refrigeration system 10 in a cooling mode of operation or a cooling cycle is as follows. In general, during the cooling cycle the evaporator 22 draws heat from the work space being cooled, whereas the condenser 20 is used to reject heat from the high pressure gas to the external environment.

To initiate a cooling cycle, a reciprocating compressor 12 receives low pressure refrigerant in the form of super-heated gas through a suction service valve 14 and compresses the gas to produce a high-pressure, super-heated gas. By reducing the volume of the gas, the compressor 12 establishes a high saturation temperature which enables heat to flow out of the condenser. The high pressure gas is discharged from the compressor 12 through a discharge service valve 16 and flows through a discharge check valve 18 into the condenser 20.

Next, a fan in the condenser 20 circulates surrounding air over the outside of condenser tubes comprising the coil. This coil is where the condensation takes place, and heat is transferred from the refrigerant gas to the air. By cooling the gas as it passes through the condenser 20, the removal of heat causes the gas to change state into a high-pressure saturated liquid. The refrigerant leaves the condenser as a high-pressure saturated liquid, and flows through valve 34, conveniently referred to as "condenser valve", into the receiver 24. As is shown in FIG. 1, valves 38 and 40, conveniently referred to as "hot gas valves", are closed thereby keeping the discharged gas from entering into a direct expansion evaporator 22.

From the air-cooled condenser 20, the high-pressure liquid then passes through open condenser valve 34 (sometimes referred to herein as condenser pressure control valve 34) and into a receiver 24. The receiver 24 stores the additional charge necessary for low ambient operation in a heating mode. The receiver 24 is equipped with a fusible plug which melts if the refrigerant temperature is abnormally high and releases the refrigerant charge. At the receiver 24, any gas remaining in the high-pressure liquid is separated and the liquid refrigerant then passes back through the manual receiver shutoff valve 30 (king valve) and into a subcooler section of the condenser 20 where it is subcooled. The subcooler occupies a portion of the main condensing coil surface and gives off further heat to the passing air. After being subcooled the liquid then flows through the filter-drier 32 where an absorbent keeps the refrigerant clean and dry.

The high-pressure liquid then passes through the electrically controlled valve 36, conveniently referred to as "liquid line valve", which starts or stops the flow of refrigerant. In addition, the high-pressure liquid may flow to a heat exchanger 26. If so, the liquid is cooled even further by giving off some of its heat to the suction gas.

Next, the cooled liquid emerging from the heat exchanger 26 passes through an externally equalized thermostatic expansion valve 28. As the liquid is metered through the valve 28, the pressure of the liquid drops, thus allowing maximum use of the evaporator heat transfer surface. More specifically, this expansion valve 28 takes the subcooled liquid, and drops the pressure and temperature of the liquid to regulate flow to the direct expansion evaporator 22. This results in a low pressure saturated liquid/gas mixture.

After passing through the expansion valve 28, the liquid enters the direct expansion evaporator 22 and draws heat from the work space being cooled. The low pressure, low temperature fluid that flows into the evaporator tubes is colder than the air that is circulated over the evaporator tubes by the evaporator fan. As a result, heat is removed from the air circulated over the evaporator 22. That is, heat from the work space is transferred to the low pressure liquid thereby causing the liquid to vaporize into a low-pressure gas, thus, and the heat content of the air flowing over the evaporator 22 is reduced. Thus, the work space experiences a net cooling effect, as colder air is circulated throughout the work space to maintain the desired temperature. Optionally, the low-pressure gas may pass through the "suction line/liquid line" heat exchanger 26 where it absorbs even more heat from the high pressure/high temperature liquid and then returns to the compressor 12.

After passing through the heat exchanger 26, the gas enters the compressor 12 through the suction service valve 14 where the process repeats itself. That is, the air cooled by the evaporator 22 is sent directly to the air conditioned work space to absorb more heat and to bring it back to the coil for further cooling.

The refrigeration system of the present invention may also be used to heat the work space or defrost the evaporator 22. During the heating/defrost cycle, a low pressure vapor is compressed into a high pressure vapor, by transferring mechanical energy from a reciprocating compressor 12 to the gas refrigerant as it is being compressed. This energy is referred to as the "heat of compression", and is used as the source of heat during the heating/defrost cycle. This refrigeration system is known as a "hot gas heat" type refrigeration system since the hot gas from the compressor is used as the heat source for the evaporator. By contrast, the present invention could also be employed with heat pumps wherein the cycle is reversed such that the heat normally rejected to the ambient air is rejected into the work space. The heating/defrost cycle will now be described in detail.

In the heating/defrost cycle, the reciprocating compressor 12 receives low pressure and low temperature gas through the suction service valve 14 and compresses the gas to produce a high pressure gas. The high temperature, high pressure gas is discharged from the compressor 12 through the discharge service valve 16. The hot gas valve 38 and the condenser pressure valve 34 are closed to prevent refrigerant from flowing through them. This closes off the condenser 20 so that once the condenser coils are substantially filled with refrigerant, the majority of the refrigerant will then flow through the discharge check valve 18 and the hot gas valve 40. The hot gas from the compressor 12 then flows into the evaporator 22, effectively transferring energy from the compressor to the evaporator and then to the work space.

A processor 100 opens valve 36 when the compressor discharge pressure falls to cut-in settings, allowing refrigerant from the receiver to enter the evaporator 22 through the expansion valve 28. The hot vapor flowing through valve 40 forces the liquid from the receiver 24 via a bypass check line and a bypass check valve 27. By opening valve 36 and closing valve 34, the refrigerant liquid is allowed to fill up and build up head pressure, equivalent to discharge pressure, in the condenser 20. Opening valve 36 also allows additional refrigerant to be metered through the expansion valve 28 so that it eventually is disposed in the condenser 20. The increase of the refrigerant in the condenser 20 causes the discharge pressure to rise, thereby increasing the heating capacity of the refrigeration system 10. This allows the compressor 12 to raise its suction pressure, which allows the refrigeration system 10 to heat. Liquid line valve 36 will remain open until the compressor discharge pressure increases to cut-out setting, at which point a processor 100 closes (shown in FIG. 2) solenoid valve 36. This stops the flow of refrigerant in the receiver 24 to the expansion valve 28. Significantly, valve 36 may be closed only after the compressor 12 is discharging at a cut-out pressure. Thus, via the evaporator 22, the high pressure refrigerant gas gives off heat to the work space, lowering the temperature of the refrigerant gas. The refrigerant gas then leaves the evaporator 22 and flows back to the compressor 12 through the suction service valve 14.

In a preferred embodiment, the hot gas valve 38 is closed if the ambient temperature is above a first predetermined temperature. If after a 60 second delay the engine remains in high speed, and the difference between ambient and discharge temperatures exceeds a pre-determined temperature differential, then valve 38 opens. On the other hand, if the difference between ambient and discharge temperatures goes below a second pre-determined temperature differential, then valve 38 closes. When in engine operation and the discharge pressure exceeds pre-determined pressure settings, pressure cutout switch (HP-1) opens to de-energize the run relay coil and stop the engine.

Figure 2:
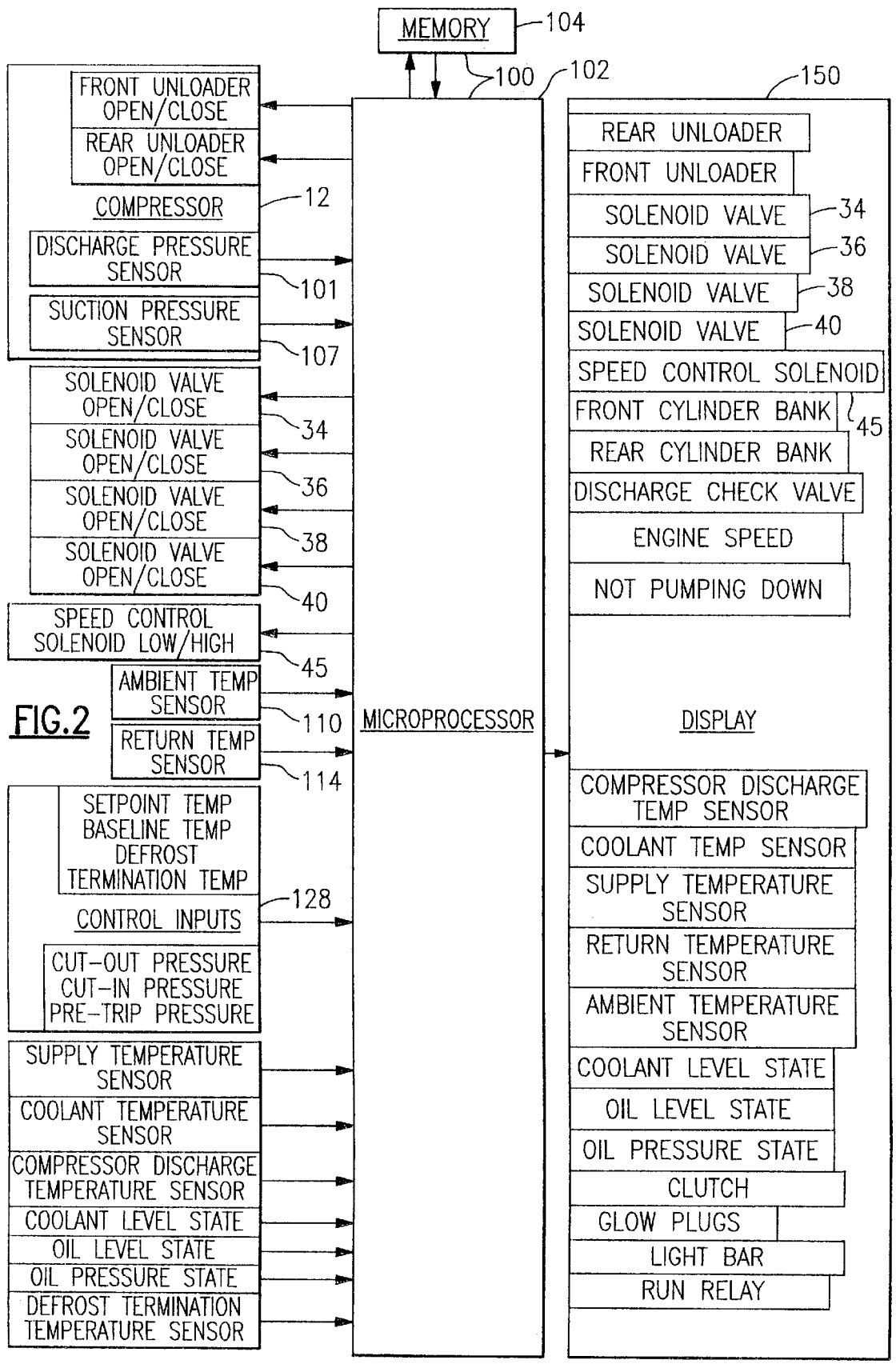
FIG. 2, is a block diagram showing a processor for interfacing with various components of the refrigeration system of FIG. 1.

Turning to FIG. 2, the refrigeration system 10 is electronically controlled by a control unit shown as being provided by a processor 100, including a microprocessor 102 and an associated memory 104. The processor 100 is connected to a display 150 which displays various parameters and also various fault alarms that exist within the refrigeration system 10.

When the refrigeration system 10 is in an operating mode to control the temperature of a work space, the processor 100 receives several inputs including an ambient temperature from an ambient temperature sensor 110, a setpoint temperature, a return temperature from a return temperature sensor 114, a baseline temperature, a suction pressure from a suction pressure transducer 107, a discharge pressure from a discharge pressure transducer 101, a cut-out pressure, a cut-in pressure and a pretrip pressure. The ambient temperature is received by the processor 100 through the ambient temperature sensor 110 on the exterior of the work space. The setpoint temperature is input to the processor 100 through an input control device 128 and is typically the desired temperature of the work space. The return temperature is the actual temperature of the work space and is received by the processor 100 through the return temperature sensor 114 located within the work space. The baseline temperature is input to the processor 100 through the input control device 128 and will be discussed later.

In addition, there are several other inputs to the processor 100 including a supply temperature, a coolant temperature, a compressor discharge temperature, a coolant level state, an oil level state, an oil pressure state, and a defrost termination temperature.

The suction pressure, sensed by the suction pressure transducer 107, is the pressure of the refrigerant vapor at the low side of the compressor 12 as it is being drawn into the compressor through the suction service valve 14. The suction pressure transducer 107 is disposed in a position to monitor the pressure through the suction service valve 14 and the suction pressure value is input to the processor 100, where the processor 100 uses the value or stores the value for later use.

The discharge pressure, sensed by the discharge pressure transducer 101, is the pressure at the high side of the compressor 12. This is the pressure of the refrigerant vapor as it is being discharged from the compressor 12 through the discharge service valve 16. The discharge pressure is monitored by a pressure transducer 101 disposed in a position to monitor the pressure through the discharge service valve 16 and the discharge pressure value is input to the processor 100, where the processor 100 uses the value or stores the value for later use.

At certain times during operation of refrigeration system 10 in an operational mode, such as a cooling, a heat/defrost mode, or a pretrip mode, it may be necessary to control an input to a system component based on a pressure differential indicator which indicates a pressure differential between different points in a refrigeration system such as between a high side and a low side of compressor 12. Because discharge pressure, suction pressure, and pressure differential normally predictably depend on one another, this pressure differential indicator can in general, be provided by any one of a discharge pressure reading, a suction pressure reading or pressure differential such as (discharge pressure minus suction pressure) reading or by a combination of such readings. Furthermore, because pressure is related to temperature, a pressure differential indicator can also normally be provided by a discharge temperature reading, a suction temperature reading, or temperature differential such as (discharge temperature minus suction air temperature) reading or by a combination of such readings. Under certain circumstances, however, such as where the refrigerant is subjected to temperature sensing in a vapor-only phase, a temperature transducer may not provide as reliable an indicator as pressure as a pressure transducer.

The cut-out pressure, cut-in pressure and pretrip pressure are user selected pressure values that are input to the processor 100 through the input control device 128 and will be discussed below.

The processor 100 determines whether to operate refrigeration system 10 in a cooling mode or heating mode by comparing the setpoint temperature to the supply and/or return temperature. If the setpoint temperature is less than the return temperature, then processor 100 operates the refrigeration system 10 in a cooling mode. If the setpoint temperature is greater than the return temperature, then processor 100 operates refrigeration system 10 in a heating mode.

In the cooling mode, the processor 100 opens and closes high-to-low side valves 34–40 according to a required protocol as described previously herein in connection with FIG. 1. In particular, the processor 100 opens valves 34 and 36 and closes valves 38 and 40, which forces the refrigerant to flow from the compressor 12 to the condenser 20, through the condenser 20 and to the receiver 24, through the receiver 24 and back to the condenser 20, through the condenser 20 and to the heat exchanger 26, through the heat exchanger 26 and through the expansion valve 28 and then to the evaporator 22, through the evaporator 22 and back through the heat exchanger 26, and then back to the compressor 12. The details of the cooling mode have been discussed above.

In the heating mode, the processor 100 opens and closes high-to-low side valves 34–40 according to a required protocol and as described previously according to FIG. 1. In particular, the processor 100 closes condenser valve 34 and opens hot gas valve 40, which causes the condenser 20 to fill with refrigerant, and forces the hot gas from the compressor 12 into the evaporator 22. The liquid line valve 36 remains open until the discharge pressure reaches the cut-out pressure, at which point the processor 100 de-energizes and closes the liquid line valve 36 thereby stopping the flow of refrigerant into the expansion valve 28. When the compressor discharge pressure falls to the cut-in pressure, the processor 100 in turn energizes the closed liquid line valve 36 which opens, allowing refrigerant from the receiver 24 to enter the evaporator 22 through the expansion valve 28. Typically, in the heating mode, valve 38 remains closed until the compressor discharge temperature rises by a predetermined amount at which point valve 38 opens. The details of the heating mode have been discussed above. From time to time, the refrigeration system 10 will be caused to cease operating in a cooling or heating/defrost mode. For example, refrigeration system 10 is employed to control the air temperature of a tractor trailer work space (known as a "box") it is typical to take the refrigeration system 10 out of a cooling or heating/defrost mode when a door of the trailer is opened for loading or unloading goods from the box. Before starting up the refrigeration system 10, or restarting the system 10 after a temporary shutdown, it is sometimes desirable to have the processor 100 execute a routine in order to determine the operational condition of various components of the refrigeration system 10. Because such a routine is useful in determining component problems which may cause the refrigeration system 10 to malfunction when placed on-line (that is, caused to operate in a cooling or heat/defrost mode), such a routine may be referred to as a "pretrip" routine.

Preferably, the pre-trip routine comprises several tests for determining the mechanical operation of each of several system components such as high-to-low side valves 34, 36, 38, 40, the discharge check valve 18, a front unloader, a rear unloader, a front cylinder bank and a rear cylinder bank (not shown) of the compressor 12.

Figure 3:
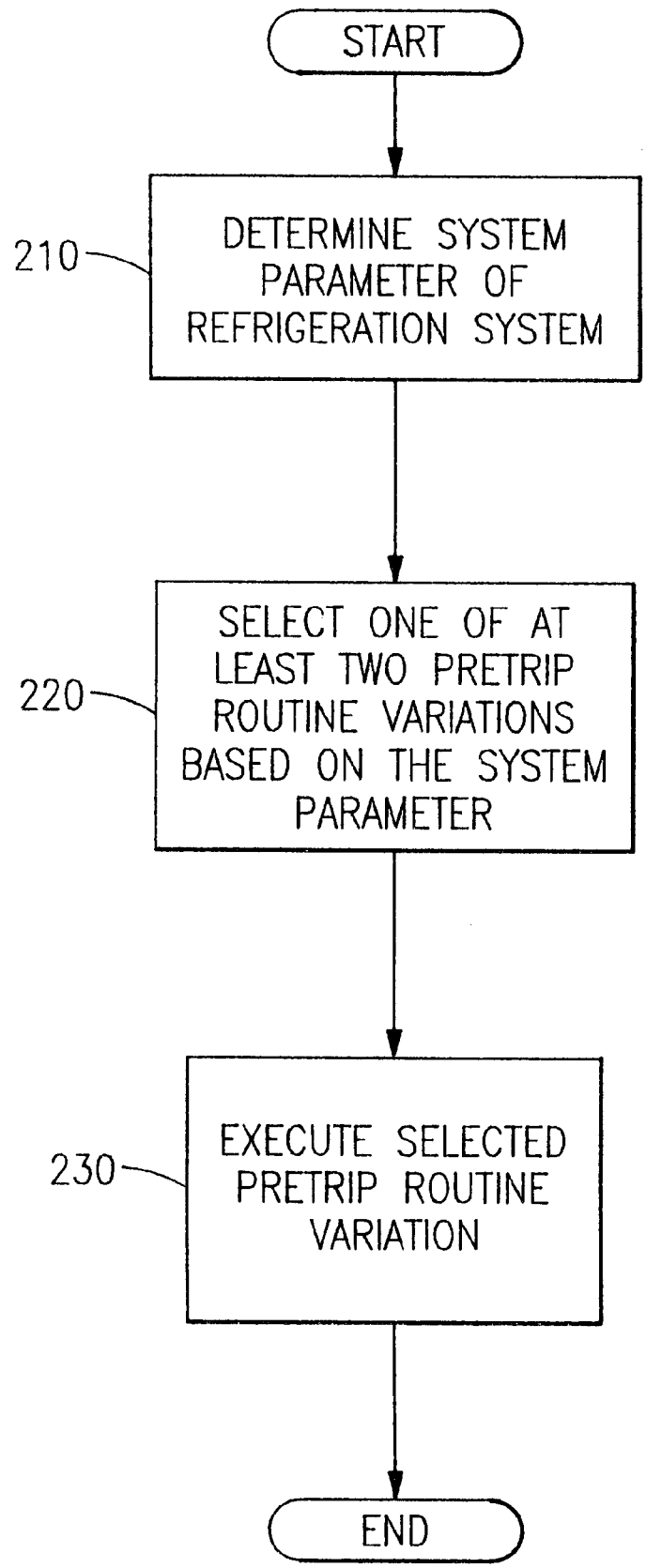
FIG. 3, is a flow diagram illustrating a first preferred embodiment of the present invention.

Referring now to FIG. 3 and to particular aspects of the present invention, the present invention relates specifically to a pretrip routine for testing the operation of a refrigeration system 10, which is normally caused to be executed prior to the refrigeration system 10 being caused to operate in a cooling or a heating/defrost mode. The pretrip routine utilizes a measurable parameter of the refrigeration system 10 in order to determine what pretrip routine variation shall be run in order to test the operation of the system 10, as indicated at step 210 of FIG. 3. Some examples of measurable parameters include the ambient temperature, the return temperature, the setpoint temperature, the operating state of the refrigeration system prior to running the pretrip routine, a manual input by the system operator, etc. From the measurable parameter, the processor 100 selects one of at least two pretrip routine variations, as indicated at step 220 of FIG. 3. Finally, the processor 100 executes the selected pretrip routine variation in order to determine the operational condition of various components of the refrigeration system, as indicated at step 230 of FIG. 3.

In one example of a pretrip routine, described with reference to FIG. 4, the processor 100 at step 310 is directed to run a pretrip routine. The processor 100 then reads the ambient temperature of the refrigeration system, as indicated at step 320. If the ambient temperature is greater than a predetermined temperature (e.g., 32 degrees Fahrenheit), then the processor 100 executes steps of a cool pretrip routine variation as indicated by step 350. If the ambient temperature is less than or equal to the predetermined temperature, then the processor 100 executes steps of a heat pretrip routine variation as indicated by step 340.

Figure 4:
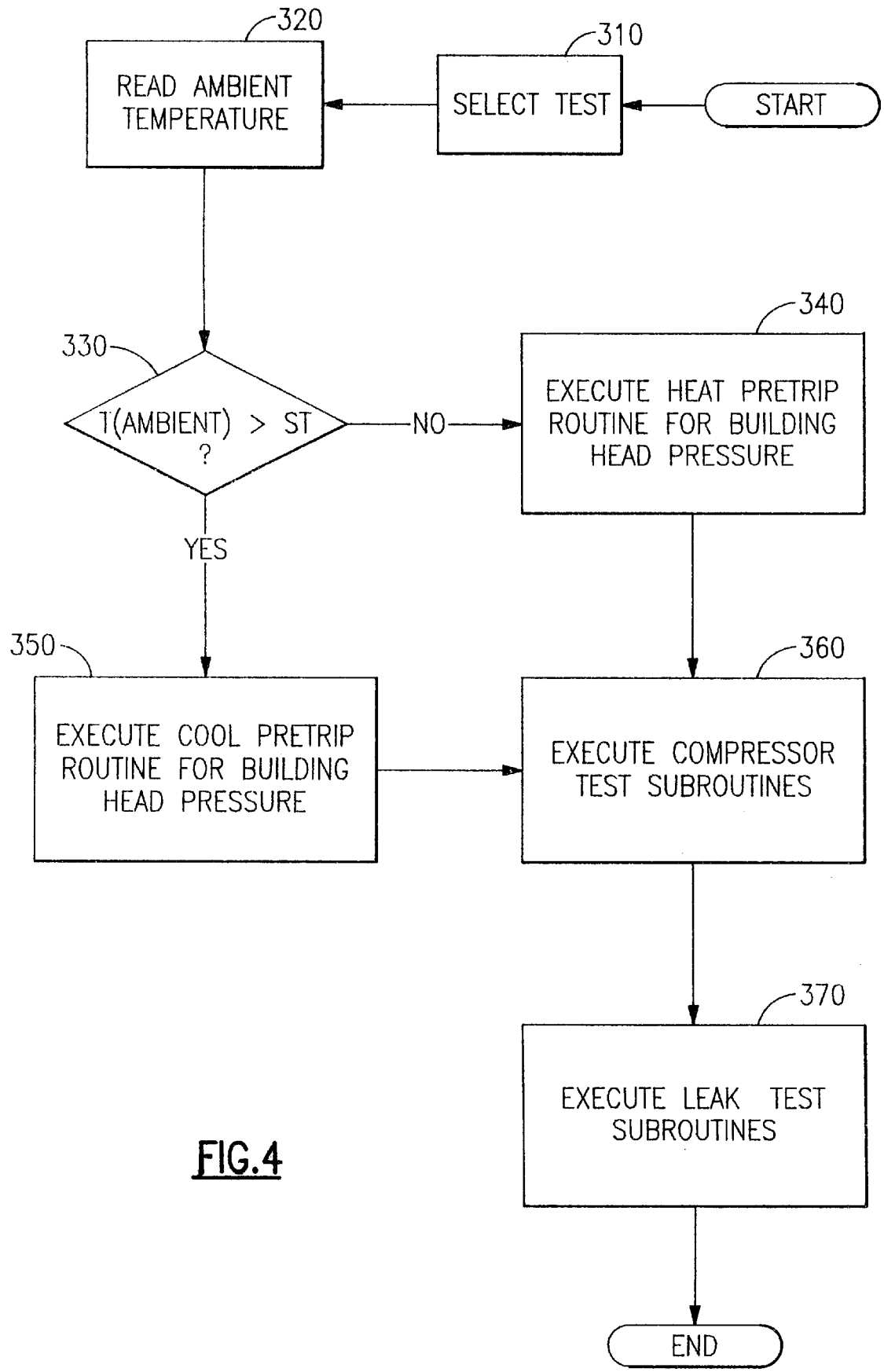
FIG. 4, is a flow diagram illustrating a second preferred embodiment of the present invention.

In the preferred embodiment of FIG. 4, it is important that the head pressure in the condenser 20 reach a predetermined value in order to test various components of the refrigeration system 10. The components may be tested by analyzing various suction and discharge pressures while the refrigeration system 10 is in various states. If the head pressure were too low, then there would be very small changes between the compressor discharge pressure produced by a loaded and unloaded cylinder bank, which results in faulty operational tests.

The head pressure is adjusted differently according to whether a cool or heat pretrip routine variation is selected. For warmer environments (cool pretrip), the discharge pressure builds quickly while operating the refrigeration system 10 in the "cooling" mode. In cooler environments (heat pretrip), it is necessary to operate the refrigeration system 10 in the "heating" mode to adequately build discharge pressure because it would normally take too long to build adequate pressure if the system 10 is operated in the "cooling" mode. For a cool pretrip, the system 10 operates in a low-capacity cooling state defined by opening condenser valve 34 and liquid line valve 36, closing hot gas valves 38 and 40, unloading the compressor 12 front and rear cylinder banks, and de-energizing the speed control solenoid thereby having the compressor run on low speed. In this "cooling" state, the discharge pressure builds naturally because of the warm ambient temperature. The refrigeration system 10 runs for a predetermined time until a quasi-steady state is reached where there are no sudden pressure spikes. At this point, the rest of the pretrip routine is performed.

For a heat pretrip routine, the head pressure is adjusted by opening liquid line valve 36 and hot gas valve 40 and closing condenser valve 34 and hot gas valve 38. The processor 100 then unloads only one cylinder bank (e.g., front cylinder bank) of the compressor 12 thereby generating increased mass flow and, therefore, an increased discharge pressures. The system 10 runs in low speed for repeatability because all systems 10 should be able to run in low speed even if the speed control solenoid is disconnected. With valve 36 open and valve 34 closed, the refrigerant from the receiver 24 flows into the condenser 20 and causes the head pressure within the condenser 20 to build up. Once the discharge pressure from the compressor 12 reaches the pretrip pressure, the processor 100 opens valve 34, thereby allowing the discharge pressure to drop. The processor 100 then closes valve 34 allowing the discharge pressure to return until the system 10 reaches the pretrip pressure. At this point, the processor 100 then closes valve 36 and unloads the previously loaded cylinder bank, thereby allowing the rest of the pretrip routine to be performed.

It should be readily apparent that different types of head pressure adjustments could be made for different types of pretrip routines. For example, the head pressure could be adjusted differently for a heat pretrip routine simply by changing the number of cylinders being loaded or unloaded or opening or closing different valves in the refrigeration system.

After the head pressure has been adjusted, various tests are performed on the system in order to determine the operational condition of various components, as indicated at steps 360 and 370 of FIG. 4. Some of these component tests are addressed in related application Ser. No. 09/234,041 entitled "Pretrip Device For Testing of a Refrigeration System Compressor", application Ser. No. 09/234,037 entitled "Pretrip Routine Comprising Tests of Individual Refrigeration System Components", application Ser. No. 09/233,775 entitled "Control Algorithm for Maintenance of Discharge Pressure", application Ser. No. 09/233,770 entitled "Test for the Automated Detection of Leaks Between High and Low Pressure Sides of a Refrigeration System", and application Ser. No. 09/234,029 entitled "Method for Automated Detection of Leaks in the Discharge Check Valve" each assigned to the same assignee of the present invention and filed concurrently herewith, and each of which is incorporated herein by reference in its entirety. The processor 100 displays any problems of the refrigeration system 10 that are discovered during the pretrip routine on a display 150.

As previously mentioned, the processor 100 may use other system parameters in deciding whether to run a cool or heat pretrip routine variation. For instance, the processor 100 can determine from the setpoint temperature or the return temperature whether to run a cool, heat, or another type of pretrip routine variation. The processor 100 may compare the setpoint temperature to a second predetermined temperature or compare the return temperature to a third predetermined temperature when deciding which pretrip routine variation to execute. Further examples of system parameters include what mode the refrigeration system was operating in prior to shutdown or what is the present geographic position or the geographic position of the point of origin or destination. Also, the selection of a particular pretrip routine variation can be made manual simply by selecting one of a possible number of pretrip routine variations.

In addition to using various system parameters, the variation in the pretrip routine may be made dependent on a system parameter. For example, in one pretrip routine, the order for testing different refrigeration system components may be made variable according to the value of a system parameter. In yet another example, which refrigeration system components are tested and which are not tested may be made variable based on a system parameter.

In still another example of a pretrip routine, the speed solenoid in the engine can be tested to determine if the engine 13 does in fact have the correct different speeds. The speed solenoid test does not require the adjustment of the head pressure. In fact, the operator can manually select to test the speed solenoid which causes the processor 100 to execute a pretrip routine for testing the speed solenoid.

Further, various pretrip routines can be caused to be executed automatically while the refrigeration system 10 is operating in a cooling or heating/defrost mode. For instance, a tractor trailer operator may wish to test the unloaders of the compressor every couple of hours as he navigates across the country. By manually selecting a pretrip unloader routine, the processor 100 will intermittently stop operating in a cooling or heating/defrost mode in order to execute a specialized one-component test pretrip routine for testing the unloaders in order to determine their operational condition. There are many other variations of the adaptive pretrip routine that are readily apparent to one skilled in the art.

Although the description of the invention has been drawn to a specific compressor and refrigeration system, it should be apparent to one skilled in the art that other types and sizes of compressors and refrigeration systems could also be monitored in the same fashion as the invention described herein.

We claim:

1. A pretrip testing method for testing the operation of a refrigeration system, said refrigeration system having at least two components, said method comprising the steps of:
   determining a refrigeration system parameter indicating an operational characteristic of said refrigeration system;
   selecting one of at least two possible pretrip routine variations based on said system parameter; and
   executing said selected pretrip routine variation in order to test the operation of said refrigeration system in accordance with a protocol that depends on said system parameter.

2. The method of claim 1, wherein said determining step includes the step of reading a temperature of said refrigeration system, said temperature selected from the group consisting essentially of an ambient temperature, a setpoint temperature, a return temperature, and a supply temperature.

3. The method of claim 1, wherein said determining step includes the step of reading the prior operating mode of said refrigeration system.

4. The method of claim 1, wherein said determining step includes the step of reading a particular geographic position.

5. The method of claim 1, wherein said determining step includes the step of manually inputting said refrigeration system parameter.

6. The method of claim 1, wherein said executing step includes the step of executing a heat pretrip routine variation.

7. The method of claim 1, wherein said executing step includes the step of executing a cool pretrip routine variation.

8. The method of claim 1, wherein said executing step includes the step of testing at least two components in an order that depends on said system parameter.

9. The method of claim 1, wherein said executing step includes the step of testing only certain components based on said system parameter.

10. The method of claim 1, wherein said executing step includes the step of building head pressure of said refrigeration system.

11. The method of claim 10, wherein said refrigeration system includes a compressor having at least one cylinder, a condenser, a receiver, and an evaporator, and wherein the building step includes the steps of:
    blocking the refrigerant from directly flowing from the compressor to the evaporator;
    allowing refrigerant to flow from the compressor to the condenser and then to the evaporator;
    unloading a first predetermined number of said at least one cylinder of the compressor; and
    running said refrigeration system for a predetermined amount of time.

12. The method of claim 10, wherein said refrigeration system includes a compressor having at least one cylinder, a condenser, a receiver, and an evaporator, and wherein the building step includes the steps of:
    allowing the refrigerant to directly flow from the compressor to the evaporator;
    allowing the refrigerant to flow from the receiver to the evaporator and then into the condenser;
    not allowing refrigerant to flow from the compressor to the condenser and then to the evaporator;

unloading a second predetermined number of said at least one cylinder of the compressor; and running said refrigeration system for a predetermined amount of time.

13. The method of claim 1, wherein said refrigeration system includes a compressor, wherein said executing step includes the step of testing the operational performance of said compressor.

14. The method of claim 1, wherein said refrigeration system includes a discharge check valve, wherein said executing step includes the step of testing the operational performance of said discharge check valve.

15. The method of claim 1, wherein said refrigeration system includes at least one refrigeration system valve, wherein said executing step includes the step of testing the operational performance of said at least one refrigeration system valve.

16. The method of claim 1, wherein said executing step includes the step of signaling a signal as to the operational condition of said refrigeration system.

17. A pretrip testing device for testing the operation of a refrigeration system, said refrigeration system having at least two components, said device comprising:

determination means for determining a refrigeration system parameter, wherein said system parameter is an indication of an operational characteristic of said refrigeration system;

selection means for selecting one of at least two possible pretrip routine variations based on said system parameter; and execution means for executing said selected pretrip routine variation in order to test the operation of said refrigeration system in accordance with a protocol that depends on said system parameter.

18. The device of claim 17, wherein said determining means includes means for reading a temperature of said refrigeration system, said temperature selected from the group consisting essentially of an ambient temperature, a setpoint temperature, a return temperature, and a supply temperature.

19. The device of claim 17, wherein said determining means includes means for reading the prior operating mode of said refrigeration system.

20. The device of claim 17, wherein said determining means includes means for reading a particular geographic position.

21. The device of claim 17, wherein said determining means includes means for manually inputting said refrigeration system parameter.

22. The device of claim 17, wherein said executing means includes means for executing a cool pretrip routine variations.

23. The device of claim 17, wherein said executing means includes means for executing a heat pretrip routine variations.

24. The device of claim 17, wherein said executing means includes means for executing a pretrip routine such that at least two components of said refrigeration system are tested in a particular order.

25. The device of claim 17, wherein said executing means includes means for executing a pretrip routine such that only predetermined components of said refrigeration system are tested.

26. The device of claim 17, wherein said executing means includes means for building head pressure of said refrigeration system based on said system parameter.

27. The device of claim 26, wherein said means for building head pressure includes:

means for blocking the refrigerant from directly flowing from the compressor to the evaporator;

means for allowing refrigerant to flow from the compressor to the condenser and then to the evaporator;

means for unloading a first predetermined number of said at least one cylinder of the compressor; and means for running said refrigeration system for a predetermined amount of time.

28. The device of claim 26, wherein said means for building head pressure includes:

means for allowing the refrigerant to directly flow from the compressor to the evaporator;

means for allowing the refrigerant to directly flow from the receiver to the evaporator and then into the condenser;

means for blocking the refrigerant to flow from the compressor to the condenser and then to the evaporator;

means for unloading a first predetermined number of said at least one cylinder of the compressor; and means for running said refrigeration system for a predetermined amount of time.

29. The device of claim 17, wherein said refrigeration system includes a compressor having at least one unloader, and wherein said execution means includes means for testing the operational condition of said at least one unloader.

30. The device of claim 17, wherein said execution means includes means for testing the operational condition of said compressor.

31. The device of claim 17, wherein said refrigeration system includes a discharge check valve, and wherein said execution means includes means for testing the operational condition of said discharge check valve.

32. The device of claim 17, wherein said refrigeration system includes at least one refrigeration system valve, wherein said execution means includes means for testing the operational condition of said at least one refrigeration system valve.

33. The device of claim 17, wherein said execution means includes means for signaling a signal as to the operational condition of said refrigeration system.

34. A refrigeration system for controlling the temperature of an area, said system including:

an evaporator for exchanging heat with said area;

a condenser for removing heat from said refrigeration system;

a compressor for raising the pressure and temperature of a refrigerant gas of said refrigeration system;

system parameter sensing means for sensing a system parameter; and a processor responsive to said system parameter sensing means for selecting one of at least two possible pretrip routine variations based on said system parameter, and wherein said processor includes controlling means for controlling the execution of said selected pretrip routines.

35. The refrigeration system of claim 34, wherein said system parameter sensing means includes means for sensing a temperature of said refrigeration system, said temperature selected from the group consisting essentially of an ambient temperature, a setpoint temperature, a return temperature, and a supply temperature.

36. The refrigeration system of claim 35, including a signal means for indicating the operational condition of said refrigeration system.

* * * * *